United States Patent [19]

Kruse et al.

[11] 4,146,049

[45] Mar. 27, 1979

[54] TRAVELING SPRINKLER RADIO-CONTROLLED MECHANISM AND WARNING DEVICE

[75] Inventors: Frederick V. Kruse, Kilbourne; Deane O. Behrends, Havana, both of Ill.

[73] Assignee: AG-RAIN Incorporated, Havana, Ill.

[21] Appl. No.: 819,885

[22] Filed: Jul. 28, 1977

[51] Int. Cl.² .............................................. B05B 3/18
[52] U.S. Cl. ..................................... 137/344; 239/71; 239/72; 239/183; 239/189; 239/191; 239/195; 137/551
[58] Field of Search .................. 137/344, 551; 239/70, 239/71, 72, 177, 183, 189, 191, 195, 212, 213

[56] References Cited

U.S. PATENT DOCUMENTS

| | | | |
|---|---|---|---|
| 3,610,531 | 10/1971 | Erickson | 239/191 |
| 3,726,477 | 4/1973 | Shapiro | 239/70 |

Primary Examiner—Gerald A. Michalsky
Attorney, Agent, or Firm—Low & Matthews

[57] ABSTRACT

A traveling sprinkler radio-controlled mechanism and warning device which obtains an adequate and controlled duration of watering at opposed ends of a field to be watered while concurrently insuring that overwatering will not occur whenever an unattended traveling sprinkler stops for any reason whatever. A re-settable time delay means is employed which obviates a common deficiency of under-watering at the opposed ends of the field while also preventing over-watering which heretofore occurred whenever an unscheduled stop occurred or where no shut down of the pump was provided for at the far end of the field. Radio transmitter and receiver means are used to transmit and receive a shutoff signal for a pump supplying water to the traveling sprinkler whenever the traveling sprinkler stops.

6 Claims, 2 Drawing Figures

4,146,049

TRAVELING SPRINKLER RADIO-CONTROLLED MECHANISM AND WARNING DEVICE

BACKGROUND OF THE INVENTION

This invention relates to an apparatus for preventing over-watering by unattended traveling sprinklers and, more particularly, to such an apparatus which utilizes a radiocontrolled shutoff mechanism for the pump for the traveling sprinkler with an option of having the operator receive an alarm or warning whenever the traveling sprinkler is turned off.

Heretofore it has been difficult to obtain adequate watering for purposes of irrigation by an unattended, water-propelled traveling sprinkler at the beginning and end of a field to be watered without effecting over-watering. Problems of over-watering are also encountered whenever the traveling sprinkler makes an unscheduled stop by virtue of hitting an obstacle, or in encountering a large ditch or the like, or when the traveling sprinkler reaches the far end of the field being watered with means provided to stop the sprinkler but with no provision being made to turn off the pump.

SUMMARY OF THE INVENTION

The foregoing difficulties and shortcomings of previous unattended, water-propelled traveling sprinklers are effectively overcome in accordance with the present invention wherein a time delay mechanism initially delays the actuation of a self-contained drive mechanism after the pump has been turned on to insure an adequate and pre-set amount of watering at the near end of the field to be watered. This same time delay mechanism is operatively connected to means which monitor the continued operation of the traveling sprinkler whereby the time delay mechanism is sequentially re-set during the operation or movement of the traveling sprinkler. Whenever the traveling sprinkler stops, the time delay mechanism is no longer re-set and a shutoff signal is broadcast by a radio transmitter on the traveling sprinkler to a radio receiver in the vicinity of the pump to shutoff the pump, thereby preventing over-watering whenever the traveling sprinkler stops.

In the absence of any mishap, the shutoff signal is received from the radio transmitter by the radio receiver when the traveling sprinkler has reached the desired and predetermined far end of the field. However, in the event of a mishap, over-watering is prevented whenever the traveling sprinkler stops, and, as an optional feature, the operator may utilize a second radio receiver in a predetermined location, such as his house, to be warned that the traveling sprinkler has been turned off prematurely, alerting the operator that the traveling sprinkler has not completed its customary run from one end of the field to the other.

In a preferred form of the invention, the means for monitoring the continued operation of the traveling sprinkler includes switch means and switch actuating means cooperatively mounted between the frame and a wheel of the traveling sprinkler.

The inherent advantages and improvements of the present invention will become more readily apparent by referring to the following description of the preferred embodiment taken in conjunction with the accompanying drawings.

DESCRIPTION OF THE PREFERRED EMBODIMENT

Figure 1:
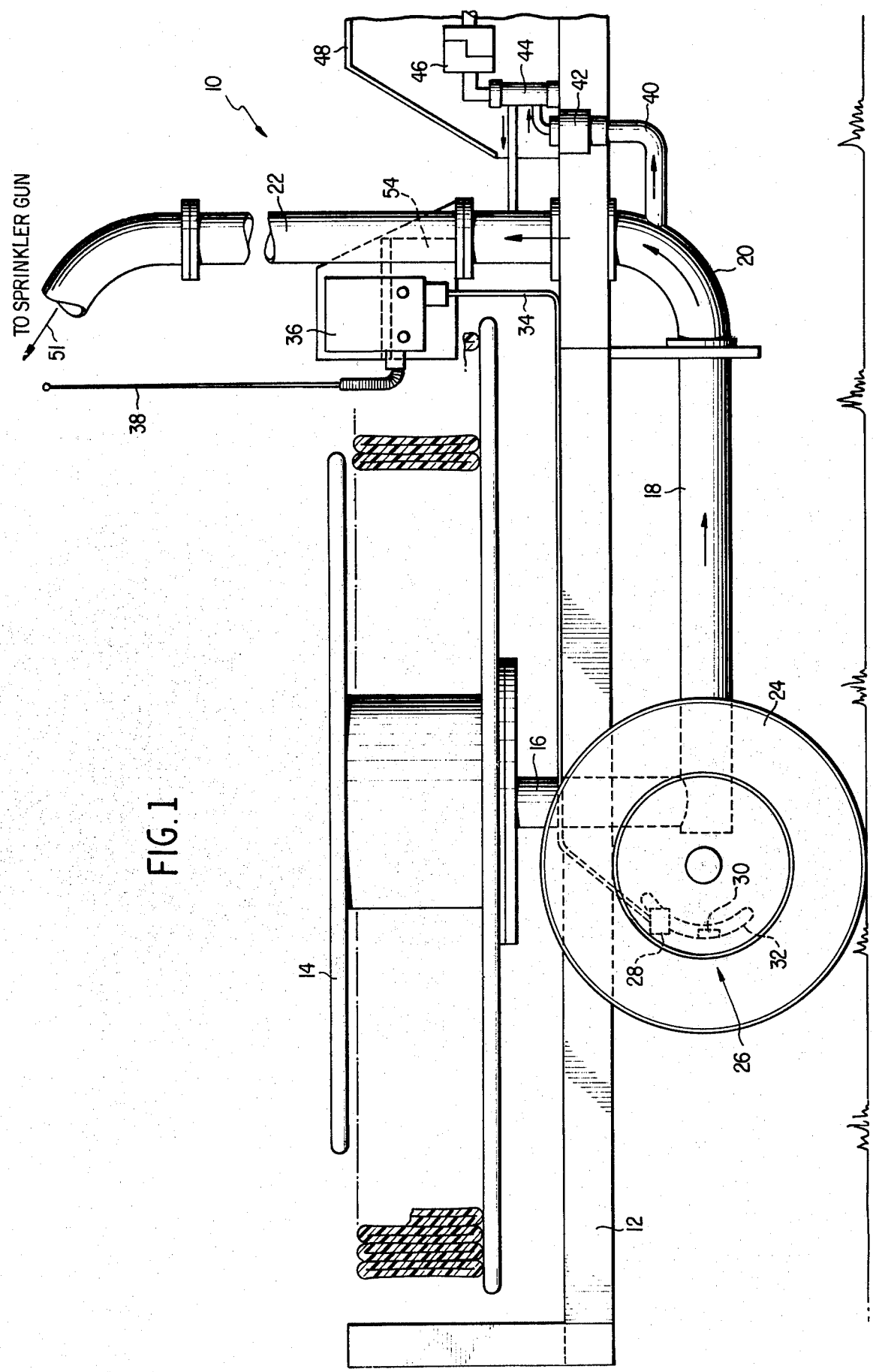
FIG. 1 is a fragmentary side elevational view showing a portion of a traveling spinkler embodying the present invention.

Referring now to FIG. 1 of the drawings, a traveling sprinkler is indicated generally at 10, having a main frame 12. The traveling sprinkler and drive mechanism may, for example, be of the type shown in Kruse et al. U.S. Pat. No. 4,003,519 issued Jan. 18, 1977. A horizontal single layer reel 14 is adapted to carry the hose which receives the water from a pump and delivers it to the traveling sprinkler in customary and conventional manner. The water pressure at the pump, for example, is in the order of magnitude of about 125–150 pounds per square inch. Reel 14 is mounted at axle 16 supported by main frame 12.

The hose is subsequently attached to the left hand end of a horizontally disposed conduit 18, supported beneath the main frame 12 with conduit 18 attached to an elbow 20 and a vertical riser pipe 22, which leads to a sprinkler gun, not shown, but which is conventional in arrangement and design.

One of the rear wheels of the traveling sprinkler is shown at 24 associated with means 26 for monitoring the continued operation of the traveling sprinkler. In a preferred form of this invention, the means 26 comprises a microswitch 28 adapted to be actuated by magnet 30 selectively positioned on a magnet mount 32, with the magnet actuating the microswitch 28 upon each rotation of wheel 24. An electrical lead 34 transmits the signal from microswitch 28 to a housing 36 for a sender unit and timer which is further provided with an antenna 38 for purposes of broadcasting a radio signal to a radio receiver means.

FIG. 1 also shows that elbow 20 is provided with a bypass 40 leading to a solenoid valve 42 which is connected to a hydraulic cylinder 44 which in turn is connected to a mechanical clutch 46 for the traveling sprinkler, all sheltered beneath a housing 48.

Figure 2:
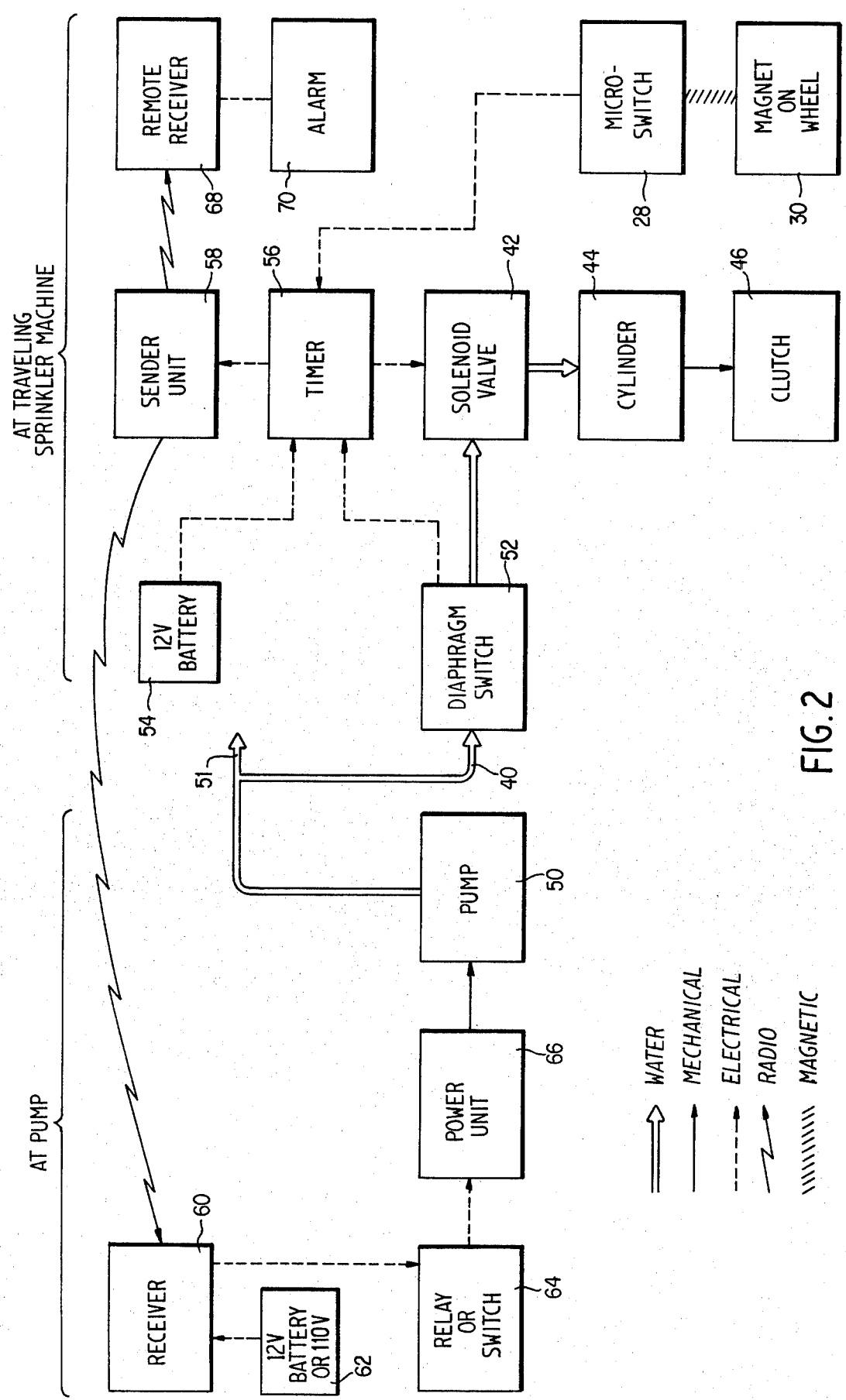
FIG. 2 is a block diagram illustrating the present invention.

Reference is made to the block diagram in FIG. 2 wherein the bracket on the left groups those items at or near the pump and the bracket on the right groups the items mainly associated with the traveling sprinkler. Pump 50 has a main output indicated by arrow 51 which leads to the sprinkler gun. In addition, a bypass 40 leads to a diaphragm switch 52 which is in series with solenoid valve 42. An electrical impulse from the diaphragm switch is presented to a timer 56 which is driven by a 12 volt battery 54. Timer 56 is re-settable in accordance with the provisions of the present invention. The initial signal from diaphragm switch 52 to timer 56 acts like a start signal and the timer begins to run for a pre-set amount of time before an output pulse is delivered to the solenoid valve 42 which is connected to cylinder 44, which in turn is mechanically coupled to a clutch 46 to begin movement of the traveling sprinkler after the initial pre-set amount of time on timer 56 lapses to insure an adequate watering of the beginning or near end of the field to be watered.

The block diagram of FIG. 2 shows another output pulse from timer 56 going to sender unit 58 or radio transmitting means, which broadcasts a shutoff signal to a first radio receiver means 60 located adjacent pump 50. Radio receiver 60 is powered either by a 12 volt battery or by a 110 volt AC source. A pulse from the radio receiver 60 is delivered to a relay or switch 64 which in turn shuts off a power unit 66 for the pump 50.

Optionally, a second radio receiver, identified as a remote receiver 68, may be employed to alert the operator that the traveling sprinkler has been stopped. Therefore, through experience, the operator can tell whether sufficient time has elapsed for the traveling sprinkler to have reached the desired far end of the field being watered or if the traveling sprinkler has encountered an obstacle or obstruction which has prevented it from traversing its anticipated course. In the latter event, the operator can locate the traveling sprinkler and re-start it on its course. A signal from the remote receiver 68 to an alarm 70 either in the form of a light or an audible signal or the like may be employed.

In operation, the traveling sprinkler is positioned at the starting point with the hose laid out and connected to the water supply pipe, to which the pump is connected. The power unit 66, either electric, gas, or diesel is turned on, starting pump 50. Watering begins at this time, but the traveling sprinkler remains stationary for the pre-set period determined by the setting of timer 56. Water pressure in the order of magnitude of 30 pounds per square inch or greater actuates diaphragm switch 52 which starts the timer 56. In actual practice, the timer is set for approximately 30 minutes. The operator reels out the cable from the cable drum of the traveling sprinkler, not shown, and connects it to an anchor at the remote end of the field. This must be accomplished within the pre-set delay time. Previously, the operator had to reel out and connect the cable to the anchor point prior to starting the pump. After a lapsed time of approximately 30 minutes, the timer electrically opens the solenoid valve 42 for from one to two minutes, namely, for a period of time sufficient to admit water to the cylinder 44, which in turn engages the clutch of the traveling sprinkler and forward travel begins. The magnet 30 mounted on wheel 24 of the traveling sprinkler now passes by microswitch 28, which re-sets timer 56 to its predetermined time delay of a full 30 minutes. Each time the magnet 28 on the rotating wheel 24 passes the microswitch 28, the timer 56 is re-set to its predetermined time delay of about 30 minutes. When the machine stops travel for any reason, and therefore magnet 30 does not pass by microswitch 28, the timer 56 runs down to zero, actuating a signal that is broadcast by the sending unit or radio transmission unit 58 to the radio receiver unit 60 at the pump, which actuates either a relay to shut down an electrically powered pump or actuates a switch to close the fuel valve on a gas or deisel-powered unit. An additional signal receiving unit 68 may be mounted at a remote location up to ten miles away, such as the operator's residence with this receiver actuating a light or alarm 70, notifying the operator that the system has shut down. The sending unit 58 and the receiver units 60, 68 are made up in any one of a number of different signal combinations so as to eliminate the possibility of interference of neighboring units. Furthermore, no interference even for identical units is encountered when a two mile interval between units is maintained. Each operator registers his system with the Federal Communications Commission, in accordance with their regulations. Broadcast frequencies of from 26.96 to 27.28 megahertz have been assigned by the FCC for these radio broadcast transmissions, but other frequencies could be employed if permitted by the appropriate regulatory body.

While the invention has been shown and described with respect to a traveling sprinkler, it is applicable to other uses. For example, it can be used in connection with center pivot irrigation devices.

While a presently preferred embodiment of the invention has been illustrated and described, it will be recognized that the invention may be otherwise variously embodied and practiced within the scope of the claims which follow.

What is claimed is:

1. In a traveling sprinkler having a self-contained drive mechanism for imparting motion to a traveling sprinkler, the combination comprising:
   (a) a pump for supplying water to said traveling sprinkler,
   (b) valve means for actuating said self-contained drive mechanism,
   (c) time delay means for delaying the initial actuation of said drive mechanism and for timing the transmission of a radio signal for shutting off said pump for a preset time period after motion of the traveling sprinkler has ceased,
   (d) radio transmitter means carried by said traveling sprinkler,
      (1) said radio transmitter means transmitting a shut-off signal for controlling a power source for said pump,
   (e) and a first radio receiver means for receiving said shutoff signal from said radio transmitter means and for controlling a power source for said pump.

2. A traveling sprinkler having a self-contained drive mechanism as defined in claim 1, including means of monitoring the continued motion of said traveling sprinkler.

3. A traveling sprinkler having a self-contained drive mechanism as defined in claim 2, wherein said means for monitoring the continued operation of said traveling sprinkler includes switch means carried by said traveling sprinkler for re-setting said time delay means.

4. A traveling sprinkler as defined in claim 2 wherein said means for monitoring the continued operation of said traveling sprinkler includes switch means and switch actuating means cooperatively mounted between the frame and a wheel of said traveling sprinkler.

5. A traveling sprinkler having a self-contained drive mechanism as defined in claim 4 wherein said switch means consists of a microswitch and said switch actuator means consists of a magnet.

6. A traveling sprinkler having a self-contained drive mechanism as defined in claim 1, including a second radio receiver means mounted in a position remote from said traveling sprinkler adapted to receive an alarm signal indicative of the stopping of said traveling sprinkler.

* * * * *